(No Model.)
C. BORDT.
SKYLIGHT.
No. 519,169. Patented May 1, 1894.
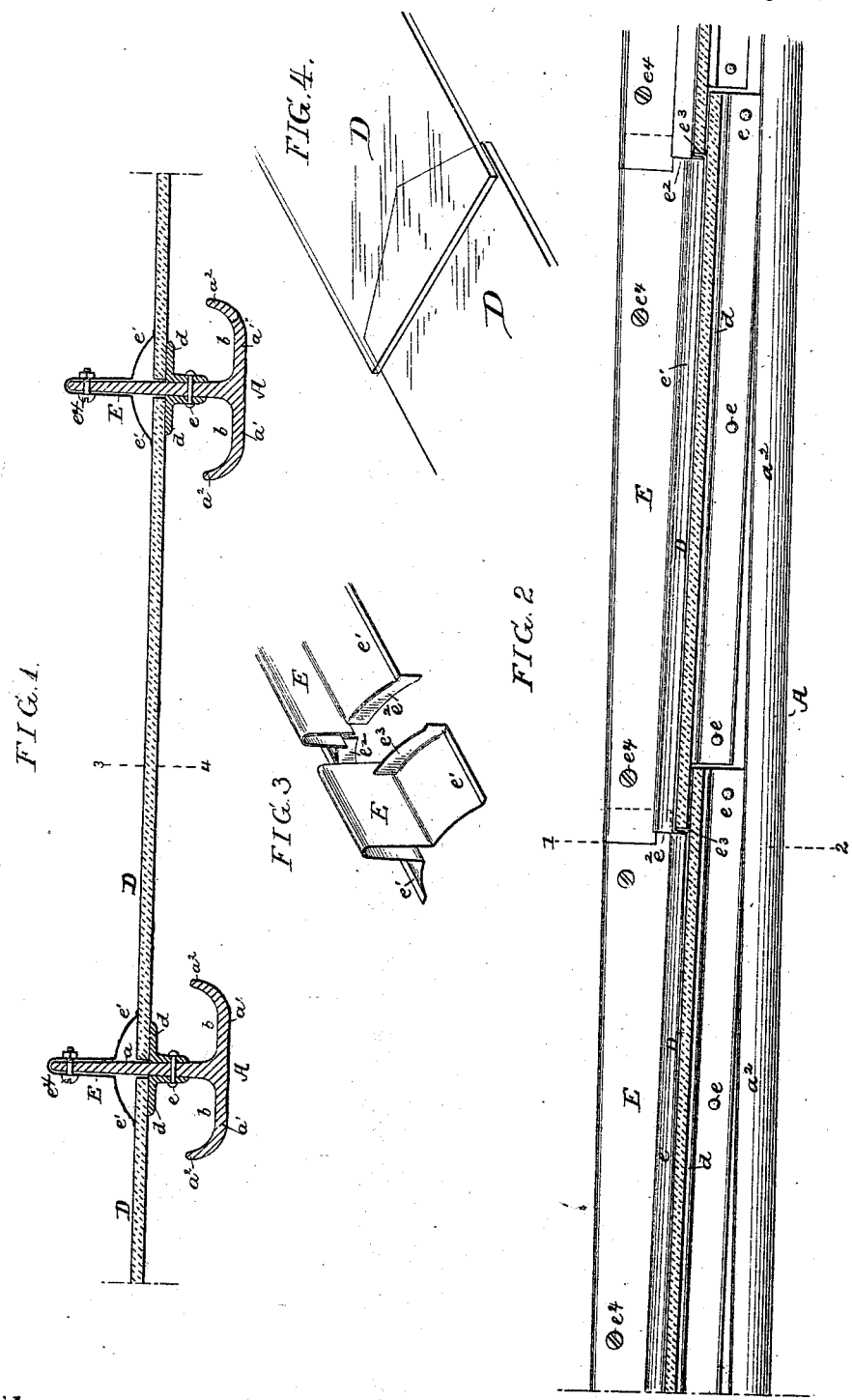
Witnesses:
Murray C. Boyer
Alex. Bartoff
Inventor
Christian Bordt
by his Attorneys
Howson & Howson

UNITED STATES PATENT OFFICE.

CHRISTIAN BORDT, OF CAMDEN, NEW JERSEY.

SKYLIGHT.

SPECIFICATION forming part of Letters Patent No. 519,169, dated May 1, 1894.

Application filed May 5, 1893. Serial No. 473,054. (No model.)

*To all whom it may concern:*

Be it known that I, CHRISTIAN BORDT, a citizen of the United States, and a resident of Camden, New Jersey, have invented certain Improvements in Skylights, of which the following is a specification.

The main object of my invention is to so construct a sky light that the supporting bars will be light, and at the same time of sufficient strength to support the glass.

A further object of the invention is to utilize the supporting bars as gutters to carry off the water which accumulates from sweat or leakage.

My invention also relates to the formation of the caps which rest upon the glass, and are secured to the supporting bars.

My invention is especially applicable to large buildings and railway train sheds which require a considerable span of glass, and to be sufficiently strong to carry the glass and snow which may accumulate upon the glass.

In the accompanying drawings:—Figure 1, is a transverse sectional view, on the line 1—2, Fig. 2, illustrating my invention. Fig. 2, is a section on the line 3—4, Fig. 1. Fig. 3, is a detached perspective view showing the details of construction of the caps; and Fig. 4, is a perspective view illustrating the manner of cutting the glass.

A are the supporting bars T-shaped in cross section, the vertical portion $a$ forming the dividing rib which supports the sheet of glass; this dividing rib extends the full length of the skylight. The portions $a'$ have their edges $a^2$ turned up, thus forming gutters $b$ between the portion $a$ and the edges, as clearly shown in Fig. 1, so that any water that may accumulate under the glass will be carried off by these gutters to suitable discharge opening; thus, the supporting bar of this shape can be made very light and strong, not interfering with the glass.

Secured to each side of the dividing rib $a$, are angle bars $d$, which form brackets for supporting the sheets of glass D. These angle bars are secured to the rib in the present instance, by rivets $e$, but other fastenings may be used without departing from my invention.

It will be noticed that the dividing rib extends considerably above the glass, and upon this rib is mounted a series of caps E, having side wings $e'$, which extend over and rest upon the upper surface of the glass, preventing, to a great extent, the leakage of water through the joints of the glass. These caps are secured to the ribs by bolts $e^4$, in the present instance.

In order to make a water tight joint between the adjoining caps, I cut away and make incisions in each end of the cap, and turn down a portion $e^2$ at one end and turn up a portion $e^3$ at the opposite end, and when the caps are placed in position, the portion $e^2$ of one cap extends over the portion $e^3$ of the adjoining cap, and over the end of the projecting glass keeping it in position. The angle bars are arranged at an incline on the supporting bars A, the angle being such that one sheet of glass will overlap the following sheet. By this means, I am enabled to use a very shallow supporting bar. It will be understood that the supporting bar can be used at any angle required, when placed in position on the roof, or other support.

In some instances, the under sheet of glass instead of being cut on a straight line, from one side to the other, may be cut at an angle, as shown in Fig. 4, so that it will carry the water that may accumulate from the sweat, off to the side gutters.

I claim as my invention—

1. The combination of the supporting T-bars A, sections of angle bars $d$ $d$ secured to each side of the said supporting bars each section being inclined so that the glass on one section will overlap the glass on the section below it, with caps E for each section, the glass of one section abutting against the end of the cap of the section below it, substantially as set forth.

2. The combination of the supporting bars A, the inclined angle bars $d, d$ secured thereto, the glass mounted upon said angle bars, the end of one sheet of glass overlapping an adjoining sheet, with caps E, E mounted on the supporting bars A and resting upon the glass, the upper end of one cap being turned up against the lower edge of the glass above and the cap of said glass being turned down over the edge of the lower cap, substantially as described.

In testimony whereof I have signed my name to this specification in the presence of two subscribing witnesses.

CHRISTIAN BORDT.

Witnesses:
FRANK E. BECHTOLD,
JOSEPH H. KLEIN.